Sol Katzen
INVENTOR.

BY Hayden & Pravel

ATTORNEYS

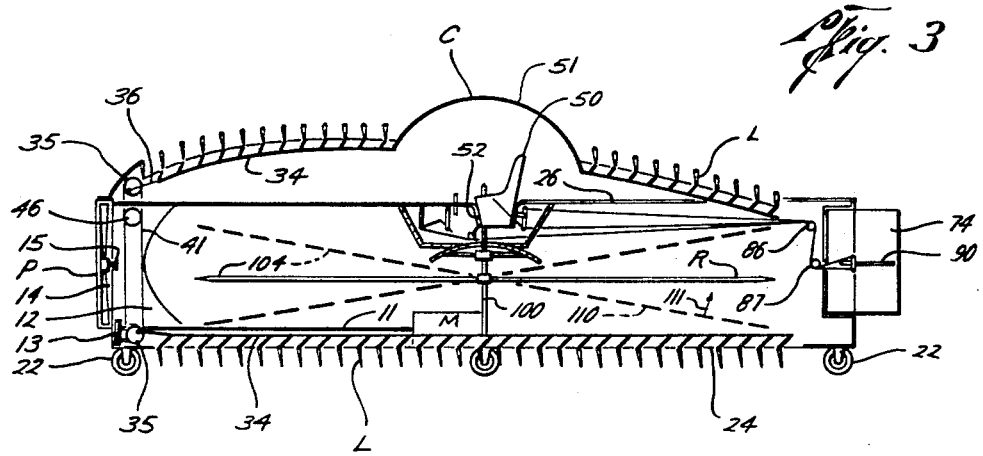
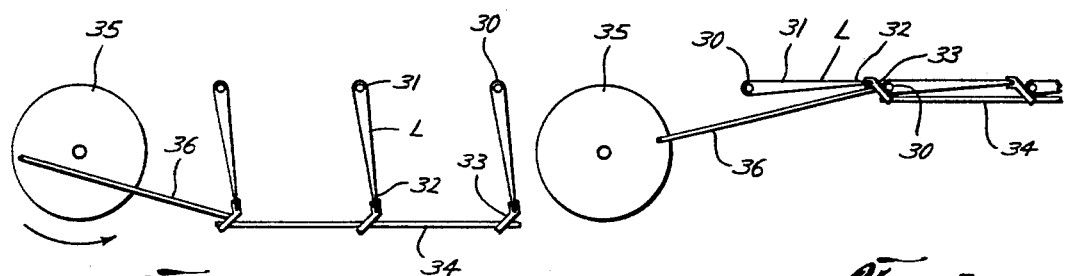
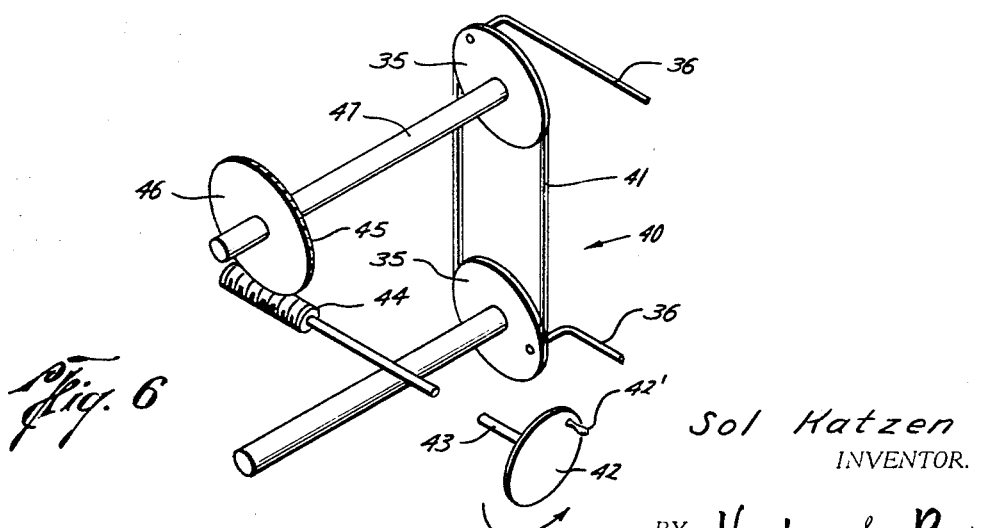

Aug. 20, 1968   S. KATZEN   3,397,852
AIRCRAFT
Filed Aug. 30, 1966   3 Sheets-Sheet 3
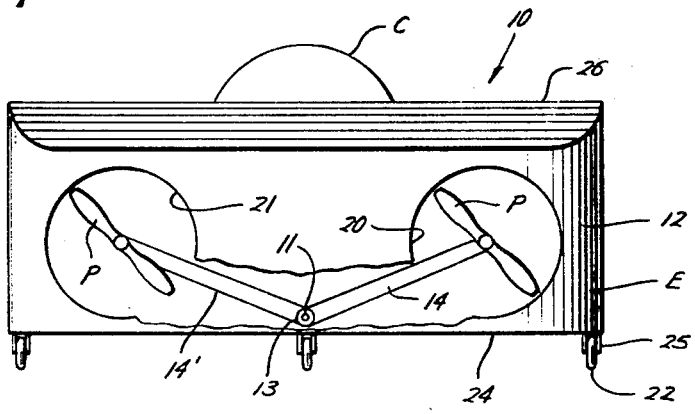
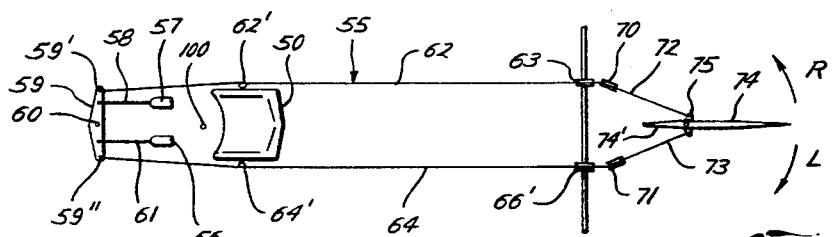
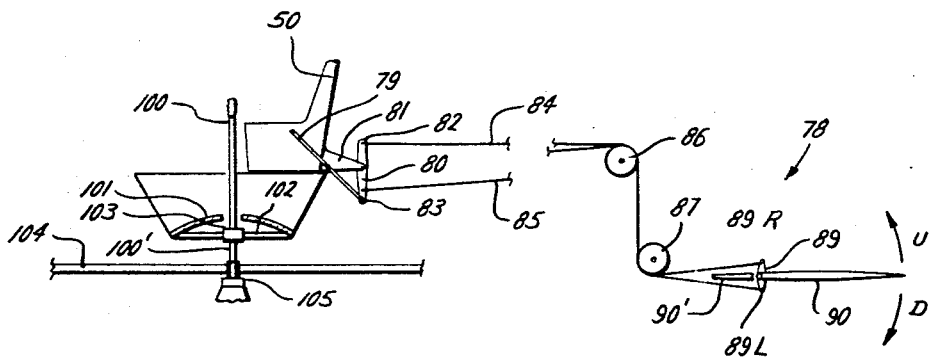
Sol Katzen
INVENTOR.
BY Hayden & Pravel
ATTORNEYS

United States Patent Office 3,397,852
Patented Aug. 20, 1968

3,397,852
AIRCRAFT
Sol Katzen, Box 138, Hermosillo, Sonora, Mexico
Filed Aug. 30, 1966, Ser. No. 576,037
6 Claims. (Cl. 244—12)

ABSTRACT OF THE DISCLOSURE

An aircraft for vertical take-off and landing and horizontal flying includes an enclosure having an adjustable rotor blade positioned therein with a suitable air thrust means secured with the enclosure for rotating the rotor blade with an air stream. A plurality of louvers positioned with the upper and lower surface of the enclosure is opened when the rotor blade is rotating to enable the aircraft to be vertically lifted. The louvers are closed when the aircraft is in horizontal flight for enabling the enclosure to form an airfoil for horizontal flight by the air thrust means secured with the enclosure.

This invention relates to a new and improved aircraft which is adapted to vertically take-off and land and yet fly horizontally during flight.

An object of the present invention is to provide a new and improved aircraft.

Still another object of the present invention is to provide a new and improved aircraft adapted to fly horizontally between vertical take-off and landing.

It is an object of the present invention to provide a new and improved aircraft having a surface adapted to form an airfoil thereon, means for creating an air flow, and a rotor blade driven by the air flow to achieve vertical flight.

Another object of this invention is to provide a new and improved aircraft capable of obtaining vertical lift without forward motion.

The preferred embodiment of this invention will be described hereinafter, together with other features thereof, and additional objects will become evident from such description.

The invention will be more readily understood from a reading of the following specification and by reference to the accompanying drawings forming a part thereof wherein an example of the invention is shown and wherein:

FIG. 3 is a partial sectional view illustrating the position of a rotor blade relative to a cabin, propellers, and the remainder of the aircraft;

FIG. 4 illustrates a connection shaft mounted with the adjustable louvers in an open position;

FIG. 5 illustrates the connection shaft mounted with the adjustable louvers in a closed position for horizontal flight of the aircraft;

FIG. 6 illustrates an arrangement for adjusting the louvers to open and closed positons;

FIG. 7 is a front view of the aircraft of the present invention illustrating the relative positions of the propellers, cabin, and enclosure of the aircraft;

FIG. 8 is a top view illustrating a rudder system of the aircraft; and

FIG. 9 is a view illustrating the relationship of an elevator system, rudder blade, control means, and cabin of the aircraft.

Briefly, the invention relates to a new and improved aircraft including a pilot's cabin, a rotor blade mounted therebelow, an enclosure for said rotor blade having adjustable louvers on the upper and lower portions of said enclosure, means mounted adjacent said enclosure adapted to move air through said enclosure at high velocity wherein said rotor blade is driven by the moving air and is thereby caused to rotate. The rotation of said blade causes the aircraft to be given a vertical lift when the adjustable louvers are open, thereby enabling the aircraft to move in a vertical path relative to the ground. When the aircraft is at a sufficient vertical height relative to the ground, the rotor blade is adapted to be adjusted so that the air moved by said means does not rotate said blade, and at or about the same time the louvers on the upper and lower portions of said enclosure are thereafter closed so that said means may drive the aircraft in a horizontal direction relative to the ground, and the enclosure is enabled to create an airfoil therearound, thereby enabling the aircraft to be flown horizontally.

Figure 1:
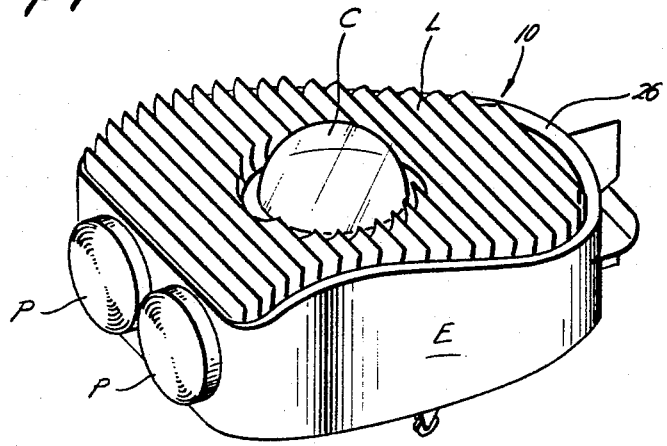
FIG. 1 is an over-all perspective view of the aircraft in vertical take-off and/or landing position.
Figure 2:
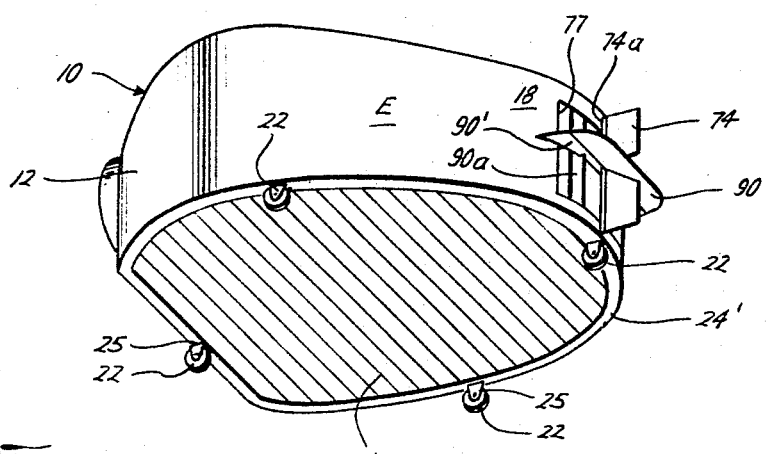
FIG. 2 is an over-all perspective view of the underside of the aircraft in horizontal flight.

As illustrated in FIGS. 1, 2, and 7, the aircraft of the present invention generally designated at 10 and is shown as generally including a cabin C, an enclosure E, a means P, and a rotor blade R (FIGS. 3 and 9) positioned in the enclosure E.

In the preferred form, a motor M as illustrated in FIG. 3 drives and rotates a drive shaft 11. The motor M is positioned in the enclosure E and adjacent a lower portion thereof, but it is to be understood that the motor M may be positoned in other places in the aircraft 10 where it is convenient to do so. The drive shaft 11 extends outwardly from the motor M toward a forward portion 12 of the enclosure E. Secured to the other end of the drive shaft 11 is a pulley 13 which is adapted to receive a pulley belt 14 for rotating a spaced pulley 15. As illustrated in FIG. 3, the spaced pulley 15 is secured to the center portion of the means P for imparting rotation to the means when the motor M, drive shaft 11, pulley belts 13 and 15, and the pulley belt 14 are in drive engagement. As illustrated in FIG. 7, there is also provided a pulley belt 14' similar to pulley belt 14 which is also secured to the pulley 13 and driven by the drive shaft 11 for imparting rotation to the means P positioned to the left of the cabin C and adjacent the forward portion 12 of the enclosure E. It is to be understood that the means P may also be driven by other suitable transmission systems such as gears, chains and the like.

It should be noted that in the preferred embodiment the means P includes a plurality of propellers,. However, it is to be understood that the means P may include jet means mounted adjacent the front portion 12 of the enclosure E without departing from the scope of the invention or that rear mounted jet means may be used when mounted adjacent a rear portion 18 of the enclosure E.

The enclosure E is shaped and formed to create an airfoil when engaged in horizontal flight. The forward portion 12 of the enclosure E is provided with openings 20 and 21 for permitting and enabling the means P to rotate adjacent the forward portion 12 of the enclosure E. As illustrated in FIGS. 1, 2, 3, and 7, a plurality of wheels 22 is secured to the underside or under portion 24 of the enclosure E and is mounted at the forward, rear, and side portions of the underside 24, respectively. It is to be understood that pontoons may be attached to the aircraft instead of the wheels 22, if desired. It should also be noted that the wheels are positioned along the edge 24' of the under portion 24 and are secured thereto by depending U-arms 25. A plurality of adjustable louvers or adjustable slats L provides the covering for the enclosure E on the lower portion 24 and an upper portion 26 of the enclosure E. It should be noted that the enclosure E is arcuately curved along the upper portion 26 thereof to enable the enclosure E to form an airfoil during horizontal flight. The adjustable louvers L are adapted to fit inside the edge 24' of the lower portion 24 and an upper edge 26' of the upper surface 26 of the enclosure E.

As illustrated in FIGS. 1 and 3, when it is desired to fly vertically with the aircraft, the louvers L are positioned in an open position such that the air flow through the aircraft 10 is down through the louvers L on the upper portion 26 of the enclosure E. When it is desired to fly horizontally with the aircraft, the louvers L are closed such that the whole enclosure E forms an airfoil for the necessary lift for horizontal flight of the aircraft 10. As illustrated in FIGS. 3, 4, 5, and 6, the louvers L are secured to the edges 24' and 26', respectively, by a plurality of pins 30 which is adapted to fit into holes (not shown) around each of the edges 24' and 26', respectively. It is, of course, to be understood that the louvers L may be secured by any other suitable means to the upper and lower portions 24 and 26 of the aircraft 10. The louvers L are adapted to rotate about the pin 30 so that they can be lifted to an open position as illustrated in FIGS. 1, 3, and 4, as will be explained hereinbelow.

One of each of the pins 30 is secured to an end 31 of the louvers L, and secured to the other end 32 thereof is a securing bracket 33. Each of the brackets 33 is secured to a common connecting rod or connecting shaft 34 which, in turn, is secured to the moving pulley 35 by an interconnecting pin or rod 36. As ilustrated in FIG. 3, each of the plurality of louvers L on each of the upper and lower surfaces 24 and 26 is driven by the same control means generally designated at 40 in FIG. 6 so that the louvers L on each of the surfaces 24 and 26 will be opened and closed at the same time. Therefore, it should be noted that in FIG. 3 each of the pulleys 35 is secured and connected together by a louver pulley belt 41 so that movement of the one pulley 35 will cause movement of the other pulley to assure that the louvers L on the upper and lower portions 24 and 26 will open and close simultaneously.

As illustrated in FIG. 5, a turn wheel 42 is adapted to be positioned in cabin C and is provided with a gripping edge 42' for rotating a shaft 43. The shaft 43 is provided at the other end with a series of circumferentially positioned grooves 44 which are adapted to be in interengagement with a series of grooved edges 45 on the outer surface of a turn wheel 46. A shaft 47 is secured at one end with the turn wheel 46, and at the other end to the upper pulley 35. When it is desired to open or close the louvers L, the turn wheel 42 is rotated in the desired direction which, in turn, rotates the circumferential grooves 44 to rotate the wheel 46 because of the interengagement of the grooves 44 with the grooved edges 45. Such rotation of the wheel 46 causes the shaft 47 to rotate which, in turn, imparts rotation to the upper pulley 35. As the upper pulley 35 rotates, the pulley belt 41 secured with upper and lower pulleys 35 imparts rotation to lower pulley 35, thereby imparting rotation to each of the interconnecting pins 36. As the pins are moved, each of the rods 34 secured to each of the brackets 33 with the louvers L are also moved in the desired direction. Therefore, the louvers L will be raised or lowered as the connecting brackets 33 are moved by the rod 34. As illustrated in FIG. 5 with the louvers L in a closed position, the brackets 33 adjacent the ends 32 of each of the louvers L is adapted to overlap and be positioned under the adjacent pin 30 of the nearby adjacent louver L so that the enclosure E will form a better airfoil when the aircraft is in horizontal flight.

As illustrated in FIGS. 3, 8, and 9, the cabin C is provided with a piot's chair 50 for enabling the pilot of the aircraft to be comfortably positioned in the cabin C. It is, of course, to be understood that the cabin C may be adapted to provide for other passengers and a copilot. The cabin C is provided with a cockpit or enclosure formed of glass, plastics, or other suitable materials for enabling the pilot to have a 360 degree view. The seat 50 is secured to the upper portion 26 of the enclosure E substantially in the center thereof. A depression or small chamber formed along the depressed walls 52 defines the portion for receiving the seat 50.

As illustrated in FIGS. 3, 8, and 9, the aircraft 10 is provided with a means for guiding and directing the aircraft in the form of rudder and elevator controls for use during horizontal flight. Thus, as shown in FIG. 8, the rudder generally designated at 55 is provided with pedals 56 and 57 for directing the aircraft to the left or the right, respectively. The pedal 57 is secured to a shaft or rod 58 which, in turn, is secured to a central rudder level rod 59. It should be noted that the rudder pedal 59 is adapted to pivot or turn about a pin 60 which is secured with the pilot's cabin (not shown). The left pedal 56 is secured by a rod 61 to the rudder level pedal 59. A rudder guide wire 62 is connected to the right-hand portion or edge 59' of the pedal 59 and extends from the pedal 59 adjacent the right-hand portion of the chair 50 to the rudder guide 63, and, similarly, a rudder cable 64 extends from the left-hand portion 59" of the pedal 59 back to the rudder guide 66. It should be noted that the chair 50 is also provided with guides 62' and 64' for spacing the rudder cables 62 and 64, respectively, from the chair 50. Each of the cables 62 and 64 after extending through the guides 62' and 64', respectively, is secured to cable retainers 70 and 71, respectively. The cable retainers 70 and 71 also have secured thereto another pair of cables 72 and 73, respectively, which extend toward a rudder 74 to be secured to a turning device 75 which is secured to the rudder 74. Each of the cables 72 and 74 is secured to the right- and left-hand side of the turning device or rudder 74, respectively, so that as the pedals 56 and 57 are depressed, the rudder 74 will, in turn, be swung or directed to the left or right, as desired, so that the aircraft 10 may be directed to the left or right while in horizontal flight. It should be noted that a retainer portion 74' mounted forwardly of the rudder 74 is adapted to remain stationary and become mounted with the enclosure E.

As illustrated in FIG. 9, there is provided a torque compensator or elevator generally designated at 78 which is for enabling the aircraft to lift upwardly or descend while in horizontal flight. An elevator control 79 is provided adjacent the chair 50. The control stick 79 is secured at its lower end to an elevator level pedal 80 which, in turn, is pivotally secured in the center thereof to an outwardly extending portion of the chair 81. The pedal 80 is provided with end portions 82 and 83 for receiving a pair of cables 84 and 85, respectively. The cables extend outwardly from the pedal 80 to be received by dual shivs 86 and 87 which are secured to the aircraft 10 adjacent a rear portion 18 of the enclosure E. The cables 84 and 85 extend outwardly from the shiv 87 and are connected to an elevator turntable or pedal 89 on each side 89R and 89L, respectively. The pedal 89 is secured to an elevator means 90 on each side thereof and is adapted to be raised upwardly and downwardly as indicated by the arrows U and D by operating the control stick 79 to cause the cables 84 and 85 to upwardly raise or lower the elevator 90. It should be noted that another retainer portion 90' mounted forwardly of the elevator 90 is adapted to remain stationary for mounting with the enclosure E.

The rudder and elevator controls 55 and 78, respectively, are mounted with the aircraft 10 as illustrated in FIGS. 1, 2, and 3 adjacent to and in an opening 77 in the rear portion 18 of the enclosure E. The elevator 90 is attached adjacent the opening 77 to the vertical posts 90a which are secured to the rear portion 18 of the enclosure E, and the rudder portion 74' is secured to the middle post 74a extending across opening 77 between the posts 90a to the enclosure E.

As illustrated in FIG. 3 and 9, a control stick 100 extends upwardly from the lower portion 24 of the aircraft into the cabin C adjacent the chair 50. Mounted with the control stick 100 is a disc 101 for supporting the cabin C. Mounted below the disc 101 is a disc 102 which receives and supports the upper disc 101 along the outer edges thereof. The disc 102 is secured substantially at its center thereof to a main rotor bearing 103. The main rotor bearing 103 is secured to the control stick 100, and depending therebelow is a free turning rotor blade 104. As illustrated in FIG. 9, a support bearing 105 is secured to the control stick 100 below the rotor blade 104 so that the portion 100' of the control stick 100 between the bearings 103 and 105 is free to rotate. It should be noted that the rotor blade 104 is not driven by a motor or any other type of driving means secured thereto. It should also be noted that rotor blade 104 is adapted to be pivoted by tilting or pivoting the control stick 100 such as the position illustrated (dotted line) in FIG. 3.

In the operation of the aircraft 10 when it is desired to vertically lift the aircraft 10, the louvers L on each of the upper and lower portions 24 and 26 are opened by actuating the means 40 as previously mentioned. It should be noted that although the preferred embodiment has disclosed louvers L on the upper and lower surfaces 24 and 26, that if desired, the louvers L on the upper surface 26 may be dispensed with. With the louvers L in the open position as illustrated in FIG. 3, the motor M will drive and rotate the means P. The means P will cause air to flow into the enclosure E and out through the opening 77 in the rear portion 18 of the enclosure E. At or about the same time, the control stick 100 is manipulated so that the rotor blade 104 and R is positioned at the angle shown by the dotted lines in FIG. 3. Such position of the rotor blade 104 is generally at an angle other than perpendicular relative to the propellers P and at an angle other than parallel relative to the upper and lower portions 24 and 26, respectively, of the enclosure E. With the rotor blade 104 in this position, the air flow through the enclosure E by the propellers P will strike the under surface of the rotor blade 104. It should be noted that most rotor blades have a curved surface and that the curved surface will have a forward or downward angle such that air striking the under surface of the rotor blade 104 therearound the point 110 will cause the blade to rotate in accordance with the leaning or downward edge of the rotor blade. If, for example, the rotor blade has a downward or leaning edge extending into the sheet on which FIG. 3 is drawn, the rotor blade would rotate into the sheet thereby creating a vertical lift on the aircraft 10. As the rotor blade begins to rotate faster, the angle of the rotor blade relative to the propellers may be increased or decreased such that more or less vertical lift may be imparted to the aircraft 10. When a sufficient vertical lift has been imparted to the rotor blade, the aircraft will lift in an upwardly direction, thereby leaving the ground and moving away vertically thereto.

As the air flow from the means P causes the rotor blade 104 to rotate, the angle of the rotor blade 104 may be adjusted relative to the means P to prevent the aircraft from moving horizontally forwardly due to the means P. As previously mentioned, when the air lift from the rotating blade is satisfactory, the aircraft is then permitted to vertically take-off.

With the aircraft in the air, if it is desired to fly horizontally, the louvers L are closed by the means 40 as previously mentioned, and the angle of the rotor blade 103 relative to the means P is adjusted such that the rotor blade 103 is substantially perpendicular to said means. It should also be noted that the rotor blades 104 would be substantially parallel to the upper and lower portions 24 and 26 of the enclosure E in this position. With the rotor blade R perpendicular to the means P, the air thrust or air flow from the means P does not strike the under surface of the rotor blade R to impart rotation thereto, but lift and rotation are maintained until the blade is depressed forward of the craft. At the ame time, the closing of the louvers L on the upper and lower portions 24 and 26 of the enclosure E enables the enclosure E to form an airfoil as the means P drives the aircraft forwardly in a horizontal direction. As previously mentioned, the aircraft may be raised upwardly or downwardly or enabled to move to the right or to the left while in horizontal flight by the elevator and rudder means 78 and 55, respectively.

What is claimed is:
1. An aircraft comprising:
 (a) a rotor blade for vertically lifting the aircraft, said rotor blade being positioned parallel to the ground when not in use;
 (b) an enclosure surrounding said rotor blade and forming an airfoil when the aircraft is in horizontal flight, said enclosure comprising:
  (1) a front portion;
  (2) a back portion having an opening therein for guiding of the aircraft during horizontal flight;
  (3) an upper and lower surface each including a plurality of adjustable louvers for guiding the aircraft during vertical flight, take-off and landing;
 (c) a cabin mounted with said enclosure, said cabin being positioned over said rotor blade;
 (d) air thrust means mounted with said enclosure for thrusting air through said opening in the back portion of said enclosure for enabling said aircraft to fly horizontally and for forming an air stream around said rotor blade; and
 (e) means for positioning said rotor blade at an angle relative to the ground wherein the air stream formed in said enclosure by said air thrust means causes rotation of said rotor blade in said enclosure to enable said aircraft to be vertically lifted by said rotating blade when said adjustable louvers are opened.

2. The structure as set forth in claim 1 wherein said adjustable louvers mounted with said upper and lower surface of said enclosure, are open for vertical take-off and landing of the aircraft to enable said rotor blade to create a vertical lift and closed when the aircraft is in horizontal flight for creation of an airfoil.

3. The structure as set forth in claim 2 wherein said means for positioning said rotor blade is actuated to move said rotor blade at an angle relative to said air thrust means to enable the underside of said blade positioned furthermost from said air thrust means to receive the air stream, thereby causing rotation of said blade for vertical lifting of the aircraft.

4. The structure as set forth in claim 3 wherein adjustment of said rotor blade transverse to said air thrust means and closing of said louvers enables said air thrust means to move the aircraft horizontally.

5. The structure as set forth in claim 4 wherein adjusting the angle of said rotor blade relative to said air thrust means controls rotation of said rotor blade.

6. The structure as set forth in claim 5 wherein adjusting said rotor blade perpendicular to said air thrust means terminates rotation of said rotor blade and vertical lifting of said aircraft.

References Cited

UNITED STATES PATENTS 2,932,468   4/1960   Kappus _____ 244—23
3,149,802   9/1964   Wigal _____ 244—17.11

OTHER REFERENCES

Aviation Week, Sept. 29, 1958, p. 26.

MILTON BUCHLER, *Primary Examiner.*

R. A. DORNON, *Assistant Examiner.*